US010605266B2

(12) United States Patent
Terauchi et al.

(10) Patent No.: US 10,605,266 B2
(45) Date of Patent: Mar. 31, 2020

(54) GAS TURBINE ENGINE

(71) Applicant: KAWASAKI JUKOGYO KABUSHIKI KAISHA, Kobe-shi, Hyogo (JP)

(72) Inventors: Koji Terauchi, Kobe (JP); Daisuke Uemura, Kobe (JP); Hiroshi Kubo, Kobe (JP); Naoto Sakai, Osaka (JP); Toshimasa Miura, Kakogawa (JP); Yuki Ishitobi, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 0 days.

(21) Appl. No.: 16/013,396

(22) Filed: Jun. 20, 2018

(65) Prior Publication Data

US 2018/0298918 A1    Oct. 18, 2018

Related U.S. Application Data

(63) Continuation of application No. PCT/JP2016/088291, filed on Dec. 22, 2016.

(30) Foreign Application Priority Data

Dec. 25, 2015 (JP) ................................. 2015-254075

(51) Int. Cl.
*F04D 29/54* (2006.01)
*F02C 7/28* (2006.01)
(Continued)

(52) U.S. Cl.
CPC .......... *F04D 29/541* (2013.01); *F01D 9/023* (2013.01); *F02C 3/06* (2013.01); *F02C 7/28* (2013.01);
(Continued)

(58) Field of Classification Search
CPC ........ F04D 29/541; F04D 29/542; F02C 7/28; F05D 2220/32; F05D 2240/12;
(Continued)

(56) References Cited

U.S. PATENT DOCUMENTS 4,719,748 A * 1/1988 Davis, Jr. ................ F01D 5/187
60/39.37
7,600,370 B2 * 10/2009 Dawson .................. F01D 9/023
60/39.37

(Continued)

FOREIGN PATENT DOCUMENTS

JP  2004-037035 A  2/2004
JP  2004-150700 A  5/2004
(Continued)

OTHER PUBLICATIONS

International Search Report for PCT/JP2016/088291 dated Mar. 28, 2017 [PCT/ISA/210].

*Primary Examiner* — Ehud Gartenberg
*Assistant Examiner* — Jacek Lisowski
(74) *Attorney, Agent, or Firm* — Sughrue Mion, PLLC

(57) ABSTRACT

A gas turbine engine includes: a plurality of combustors disposed so as to incline radially outward from a turbine side toward a compressor side; and a diffuser inner tube and outer tube forming a diffuser as an upstream portion of a path that introduces a compressed gas from the compressor to the combustors. A transition duct portion of each combustor has such a shape that a circumferential dimension thereof gradually decreases from the turbine side to the compressor side so that a circumferential gap is formed between the transition duct portions. Downstream-side portions of the diffuser inner tube and outer tube each have a shape gradually increasing in diameter toward the downstream side. A turbine-side end of the circumferential gap at an inner diameter (Continued)

side of the transition duct portion is positioned radially inward of an imaginary extension conical surface continuous from the diffuser inner tube.

10 Claims, 4 Drawing Sheets

(51) Int. Cl.
    *F23R 3/42*     (2006.01)
    *F02C 3/06*     (2006.01)
    *F04D 19/02*     (2006.01)
    *F01D 9/02*     (2006.01)
    *F23R 3/04*     (2006.01)
    *F23R 3/46*     (2006.01)

(52) U.S. Cl.
    CPC .......... *F04D 19/02* (2013.01); *F04D 29/545* (2013.01); *F23R 3/04* (2013.01); *F23R 3/42* (2013.01); *F23R 3/46* (2013.01); *F05D 2220/32* (2013.01); *F05D 2240/12* (2013.01); *F05D 2240/35* (2013.01); *F05D 2250/52* (2013.01); *F05D 2260/60* (2013.01)

(58) Field of Classification Search
    CPC .......... F05D 2240/35; F23R 3/04; F23R 3/54; F23R 3/002; F23R 3/46; F01D 9/023
    See application file for complete search history.

(56) References Cited

U.S. PATENT DOCUMENTS

| | | | |
|---|---|---|---|
| 9,133,722 B2 | 9/2015 | LeBegue et al. | |
| 2002/0157400 A1* | 10/2002 | Schulten | F23R 3/46 60/772 |
| 2007/0175220 A1 | 8/2007 | Bland | |
| 2007/0271923 A1* | 11/2007 | Dawson | F01D 9/023 60/751 |
| 2012/0017594 A1 | 1/2012 | Kowalski et al. | |
| 2013/0283804 A1 | 10/2013 | LeBegue et al. | |
| 2014/0133986 A1* | 5/2014 | Matsuoka | B23K 15/0073 416/124 |
| 2014/0150452 A1 | 6/2014 | Pohlman et al. | |
| 2015/0167986 A1 | 6/2015 | Montgomery et al. | |

FOREIGN PATENT DOCUMENTS

| | | |
|---|---|---|
| JP | 2012-062900 A | 3/2012 |
| JP | 2013-231576 A | 11/2013 |

* cited by examiner

FRONT — REAR

GAS TURBINE ENGINE

CROSS REFERENCE TO THE RELATED APPLICATION

This application is a continuation application, under 35 U.S.C. § 111(a), of international application No. PCT/JP2016/088291, filed Dec. 22, 2016, which claims priority to Japanese patent application No. 2015-254075, filed Dec. 25, 2015, the disclosure of which are incorporated by reference in their entirety into this application.

BACKGROUND OF THE INVENTION

Field of the Invention

The present invention relates to a gas turbine engine, and particularly to the structure of a passage which guides a compressed gas from a compressor to a combustor.

Description of Related Art

Generally, in a gas turbine engine, a diffuser is provided at an outlet of an axial-flow compressor, whereby static pressure of a compressed gas is recovered, and pressure loss (mainly, dynamic pressure loss) which occurs until the compressed gas flows into a combustor is reduced (refer to Patent Document 1, for example).

RELATED DOCUMENT

Patent Document

[Patent Document 1] JP Laid-open Patent Publication No. 2012-062900

SUMMARY OF THE INVENTION

However, in the case where the axial dimension of the diffuser is increased for the purpose of reducing the pressure loss as described above, the axial dimension of the entire gas turbine engine also increases along with the increase in the axial dimension of the diffuser.

In order to solve the above-described problem, an object of the present invention is to provide a gas turbine engine capable of reducing a pressure loss of a compressed gas that is introduced from a compressor into a combustor, while suppressing an increase in the dimension of the entire gas turbine engine.

In order to attain the above-described object, a gas turbine engine according to the present invention is a gas turbine engine in which a compressed gas from a compressor is burned and an obtained combustion gas drives a turbine. The gas turbine engine includes: a plurality of combustors, each combustor having a tubular shape, being configured to burn the compressed gas from the compressor, and being positioned such that an axis thereof inclines, with respect to a rotation axis of the gas turbine engine, radially outward from a side on which the turbine is located toward a side on which the compressor is located; a diffuser outer tube forming an outer diameter side wall of a diffuser of an annular shape that forms an upstream portion of a compressed gas supply path configured to guide the compressed gas discharged from the compressor to the combustors; a diffuser inner tube disposed concentrically with the diffuser outer tube, and forming an inner diameter side wall of the diffuser; and a transition duct portion that is a portion of each combustor disposed inside a chamber forming a downstream portion of the compressed gas supply path, the transition duct portion being configured to supply the combustion gas from the combustor to the turbine. The transition duct portion of each combustor has such a shape that a circumferential dimension thereof gradually decreases from the side on which the turbine is located toward the side on which the compressor is located, so that a circumferential gap is formed between adjacent transition duct portions. At least portion on a downstream side of the diffuser inner tube and at least portion on a downstream side of the diffuser outer tube have respective shapes gradually increasing in diameter toward the downstream side. A turbine-side end of the circumferential gap at an inner diameter side of the transition duct portion is positioned radially inward of an imaginary extension conical surface extending continuously from an outer peripheral surface of the diffuser inner tube. The diffuser may include an outlet having an inclination angle equal to or smaller than 90° with respect to the rotation axis.

According to this configuration, a sufficient circumferential gap is formed in the chamber between the transition duct portions of the combustors. The compressed gas is discharged from the outlet of the diffuser directed radially outward, toward this circumferential gap. Therefore, even in the narrow space inside the chamber where the plurality of transition duct portions are densely disposed, a sufficient flow path for the compressed gas discharged from the diffuser is ensured. Thus, the pressure loss of the compressed gas supplied from the compressor to the combustors can be sufficiently reduced while suppressing an increase in the axial dimension of the entire gas turbine engine by disposing the diffuser and each combustor such that the axial positions thereof overlap each other.

In one embodiment of the present invention, the transition duct portion of each combustor may include a duct body that forms a supply path for the combustion gas, and a duct cover that covers an outer periphery of the duct body, and the duct cover may be formed with a plurality of introduction holes configured to introduce the compressed gas into the combustor. According to this configuration, the compressed gas is introduced into the combustors from the transition duct portions that are located in the direction along which the compressed gas is discharged from the diffuser, and are sufficiently spaced apart from each other in the circumferential direction. Therefore, the pressure loss of the compressed gas supplied from the compressor to the combustors can be reduced more effectively.

In one embodiment of the present invention, an auxiliary element of the gas turbine engine may be disposed in a space in the chamber formed between the imaginary extension conical surface and a rotary shaft of the gas turbine engine. For example, the diffuser inner tube may have a downstream-side end portion formed with a connection flange surface extending radially inward, and a chamber inner tube forming an inner diameter side wall of the chamber may be connected to the connection flange surface via an inner tube connecting member which is the auxiliary element. Alternatively, a seal member, which is the auxiliary element, configured to adjust a pressure of a gas extracted from the compressor may be connected to the connection flange surface via a seal connection member which is the auxiliary element. According to this configuration, since the outlet of the diffuser is oriented outward, a space is formed in an area where the compressed gas discharged from the diffuser outlet does not directly collide against the space, and the components are disposed in this space. Therefore, the pressure loss due to collision of the compressed gas against the components is reduced. Moreover, since the rotary shaft need not be made thinner to form such a space, rotational vibration of the rotary shaft is effectively suppressed.

In one embodiment of the present invention, an inner wall surface of a portion, forming the chamber, of a housing of the gas turbine engine, may have a concave surface along an outer peripheral shape of each combustor, and a connection portion positioned between adjacent concave surfaces may project into a space between adjacent combustors. According to this configuration, the compressed gas is uniformly supplied in the circumferential direction by the connection portion between the concave surfaces of the casing, and thereafter, is guided to the combustor surface by the concave surface and smoothly introduced into the combustor. Therefore, the pressure loss is reduced more effectively.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment according to the present invention will be described with reference to the drawings. However, the present invention is not limited to the embodiment.

Figure 1:
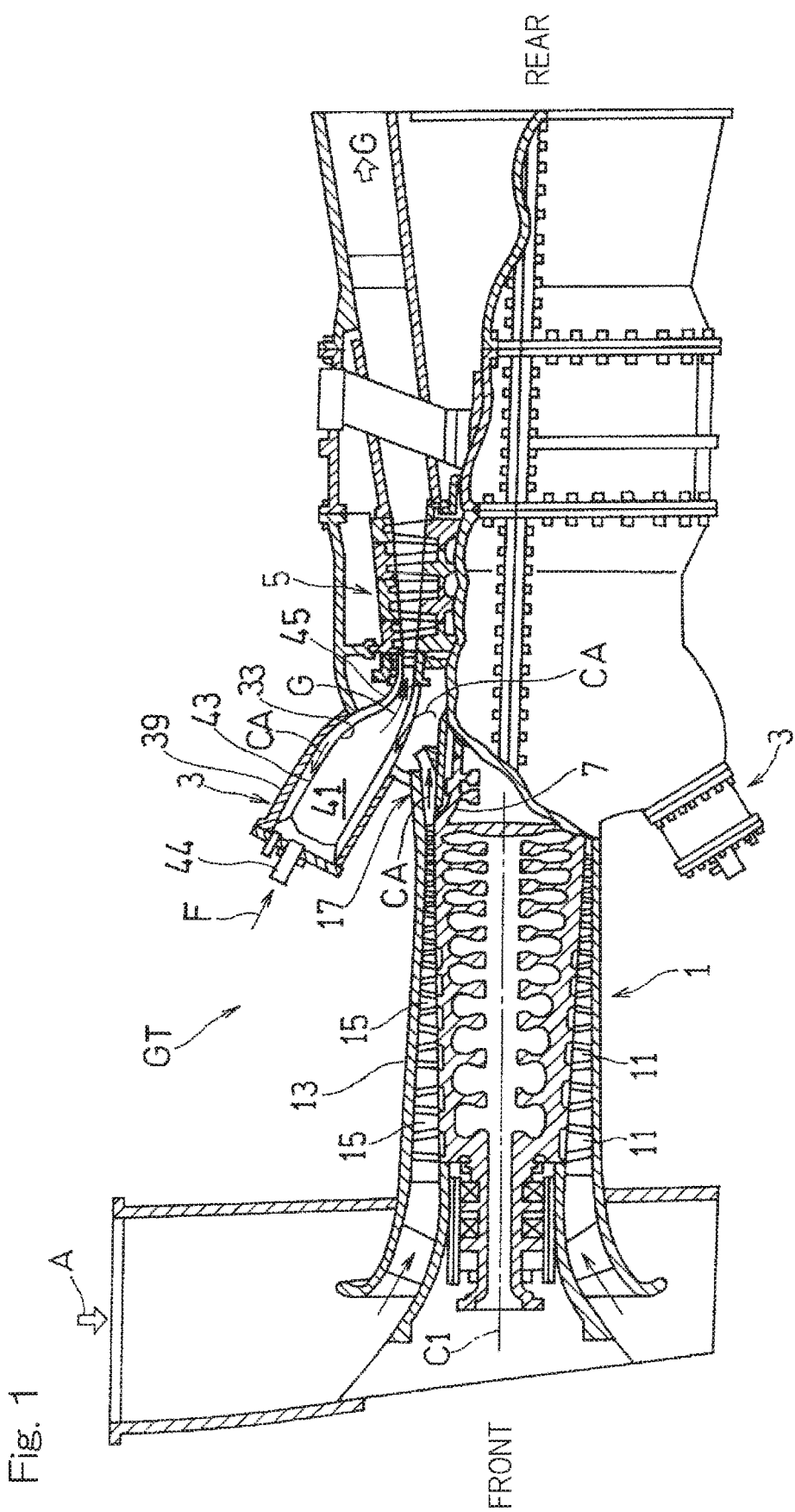
FIG. 1 is a partially cut-away side view showing a schematic structure of a gas turbine engine according to an embodiment of the present invention.

FIG. 1 is a partially cut-away side view of a gas turbine engine (hereinafter simply referred to as "gas turbine") GT according to one embodiment of the present invention. In the gas turbine GT, an air A introduced from the outside is compressed by a compressor 1 and guided to a combustor 3, a fuel F is burned together with the compressed air CA in the combustor 3, and a turbine 5 is driven by using the obtained high temperature and high pressure combustion gas G. In the present embodiment, a plurality of can-type combustors 3 are arranged at equal intervals along the circumferential direction of the gas turbine GT. In the description below, the compressor 1 side in the axis C1 direction of the gas turbine GE may be referred to as "front side", and the turbine 5 side in the axis C1 direction of the gas turbine GT may be referred to as "rear side". The terms "front" and "rear" included in the names of elements constituting the embodiment have the same meanings. In addition, in the description below, the terms "axial direction", "circumferential direction", and "radial direction" respectively mean the axis C1 direction, the circumferential direction, and the radial direction of the gas turbine GT, unless otherwise specified.

Figure 2:
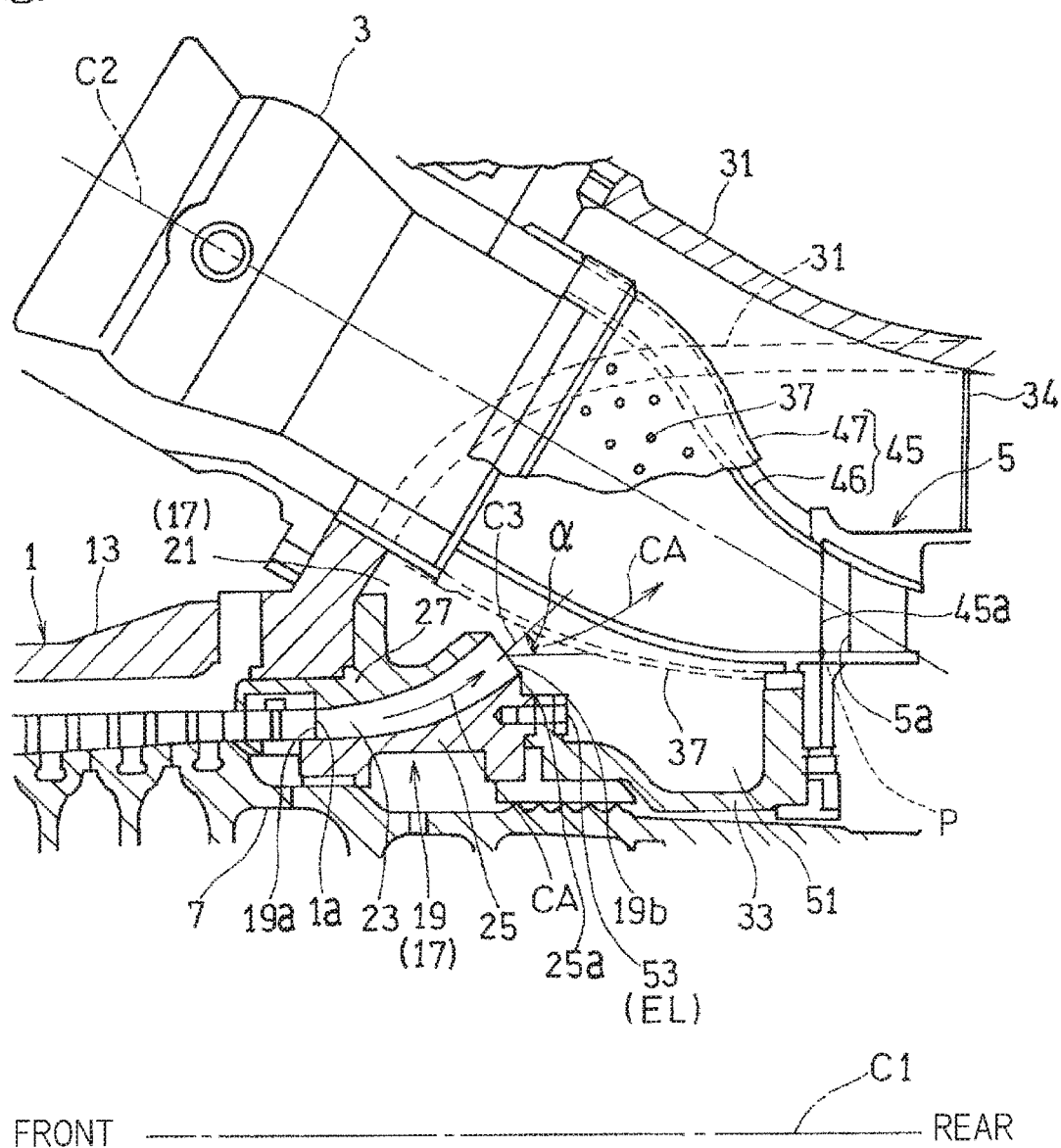
FIG. 2 is a longitudinal cross-sectional view showing, in an enlarged manner, a peripheral portion of a diffuser of the gas turbine engine shown in FIG. 1.

In the present embodiment, a compressor of an axial flow type is used as the compressor 1. The axial-flow compressor 1 compresses the air A taken from the outside, by using a combination of: multiple rotor blades 11 disposed on an outer peripheral surface of a rotor 7 forming a rotary part of the gas turbine GE; and multiple stator blades 15 disposed on an inner peripheral surface of a housing 13 of the entire gas turbine GT. As shown in FIG. 2, the compressed air CA obtained from the compressor 1 is supplied to the combustor 3 through a compressed air supply path 17 connected to an outlet 1a of the compressor 1. The combustion gas G generated in the combustor 3 flows from a first-stage turbine stator blade serving as an inlet 5a of the turbine 5 into the turbine 5.

The compressed air supply path 17 includes: a diffuser flow path 23, inside a diffuser 19 that forms an upstream portion of the compressed air supply path 17; and a chamber 21 which is located downstream of the diffuser 19 and guides the compressed air CA having passed through the diffuser 19 into the combustor 3. The diffuser 19 guides the compressed air CA discharged from the outlet 1a of the compressor 1 toward the rear side in the axial direction. The diffuser 19 includes the diffuser flow path 23 having a flow-path area gradually increasing from the inlet 19a of the diffuser 19, which is connected to the compressor outlet 1a, toward the rear side. The compressed air CA discharged from the compressor outlet 1a passes through the diffuser flow path 23, whereby the static pressure is recovered.

In the present embodiment, the diffuser 19 includes two tubular members disposed concentrically with each other, i.e., a diffuser inner tube 25 and a diffuser outer tube 27. The diffuser inner tube 25 forms an inner diameter side wall of the diffuser 19, and the diffuser outer tube 27 disposed radially outward of the diffuser inner tube 25 forms an outer diameter side wall of the diffuser 19. An annular space between the diffuser inner tube 25 and the diffuser outer tube 27 forms the diffuser flow path 23 through which the compressed air CA flows.

At least a portion, on the downstream side, of the diffuser inner tube 25 and at least a portion, on the downstream side, of the diffuser outer tube 27 each have respective shapes gradually increasing in diameter toward the downstream side. More specifically, in the illustrated example, each of the diffuser inner tube 25 and the diffuser outer tube 27 has such a curved shape that an inclination angle thereof with respect to the axial direction in a longitudinal sectional view gradually increases from a front end portion thereof forming the diffuser inlet 19a toward a rear end portion thereof forming the diffuser outlet 19b. Since the diffuser outer tube 27 and the diffuser inner tube 25 each have such a shape, the diffuser flow path 23 inclines at the diffuser outlet 19b radially outward with respect to the axial direction.

Figure 3:
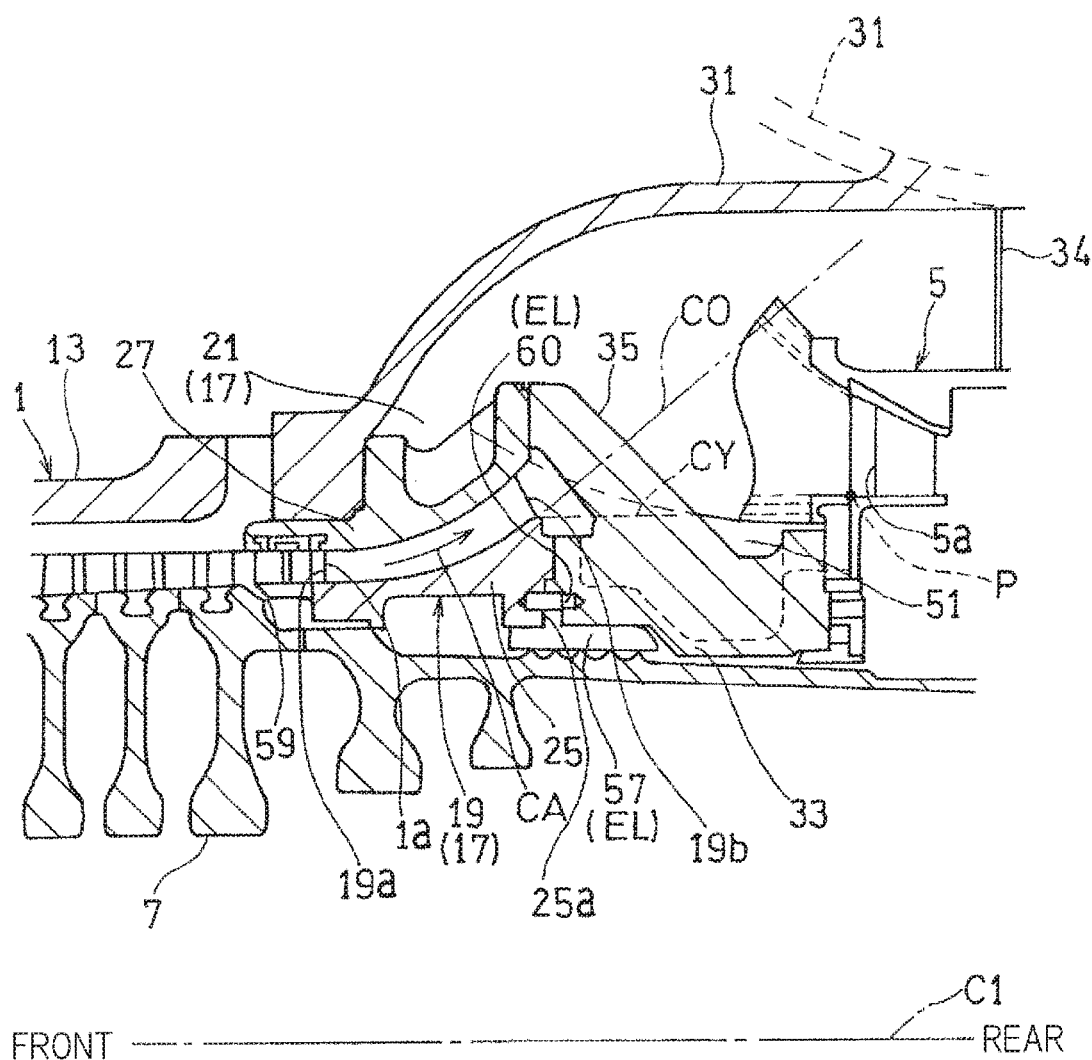
FIG. 3 is a longitudinal cross-sectional view showing, in an enlarged manner, the peripheral portion of the diffuser of the gas turbine engine shown in FIG. 1.

The chamber 21 is a substantially annular space, and a plurality of combustors 3 are disposed spaced apart from each other in the circumferential direction in the annular space. The chamber 21 is formed inward of a chamber casing 31, which forms a portion of the housing 13 of the entire gas turbine GT and is provided radially outward of the compressed air supply path 17. An inner diameter side wall of the chamber 21 is formed by a chamber inner tube 33 connected to a rear portion of the diffuser inner tube 25. A rear end portion of the chamber 21 is partitioned from a space on the outer diameter side of the turbine 5 by a turbine partition wall 34. As shown in FIG. 3, a plurality of struts 35 projecting radially are provided in the circumferential direction on an outer peripheral surface of the chamber inner tube 33. In the illustrated example, the diffuser outer tube 27 is supported by the chamber casing 31 and the struts 35.

As shown in FIG. 2, in the present embodiment, each combustor 3 is positioned such that an axis C2 thereof inclines radially outward from the rear side (the side on which the turbine 5 is located) toward the front side (the side on which the compressor 1 is located) with respect to the rotation axis C1 of the gas turbine GT.

A portion of each combustor 3 that is disposed inside the chamber 21 is formed as a compressed air introduction portion formed with a plurality of compressed air introduction holes 37 through which the compressed air CA is introduced into the combustor 3.

In this example, as shown in FIG. 1, each combustor 3 is a reverse flow can-type combustor, in which the compressed air CA flows toward a top portion of the combustor 3 through a path between a combustor housing 39 and a combustor inner tube 43 having a combustion chamber 41 formed therein. A fuel F is supplied into the combustion chamber 41 through a fuel nozzle 44 provided in the combustor 3. Each combustor 3 is provided with a transition duct portion 45 which supplies the high-temperature combustion gas G generated in the combustion chamber 41 to the turbine 5 disposed rearward in the axial direction. As shown in FIG. 2, the transition duct portion 45 includes: a duct body 46 having a supply path for the combustion gas G formed therein; and a duct cover 47 that covers the outer periphery of the duct body 46 via a gap. The entirety of the transition duct portion 45 is disposed inside the chamber 21 and is covered with the chamber casing 31.

Multiple compressed air introduction holes 37 for introducing the compressed air CA into the combustor 3 are formed over substantially the entire surface of the duct cover 47. That is, the duct cover 47 functions as the compressed air introduction portion for introducing the compressed air CA into the combustor 3. Depending on the type and/or the structure of the combustor 3, the duct cover 47 may be omitted, and a portion or a member other than the duct cover may be used as the compressed air introduction portion.

Figure 4:
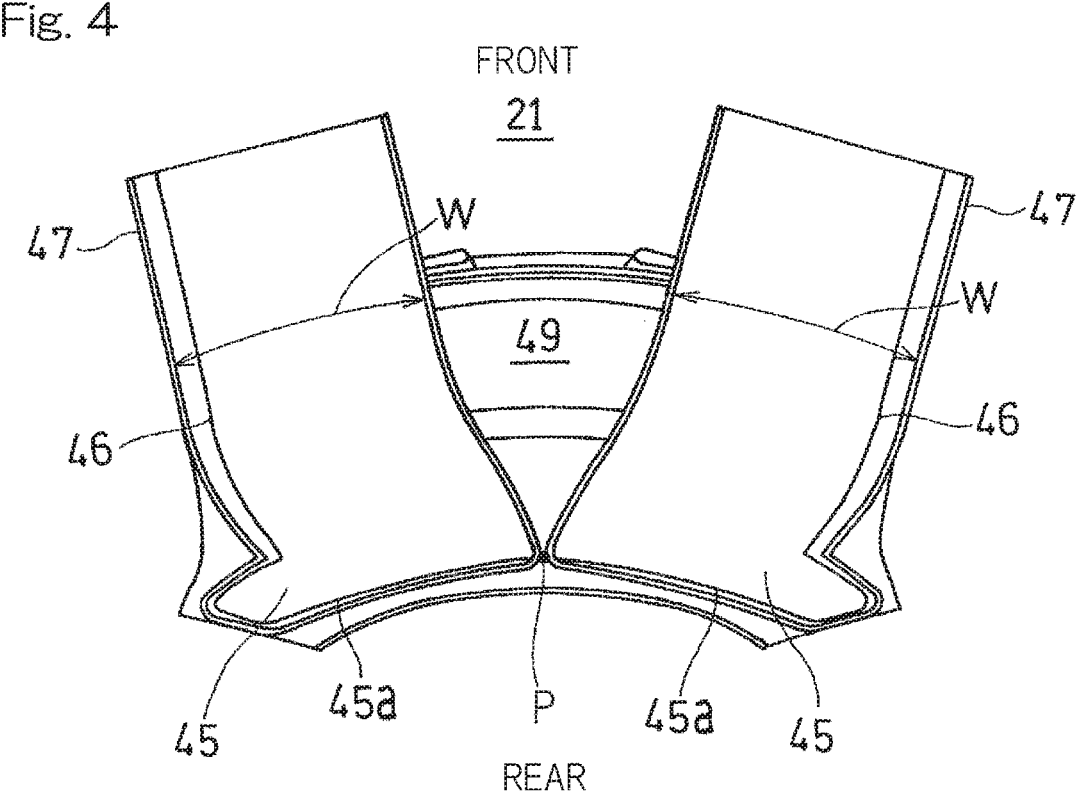
FIG. 4 is a perspective view schematically showing the positional relationship between two adjacent combustors used in the gas turbine engine shown in FIG. 1.

As shown in FIG. 4, in the present embodiment, the transition duct portion 45 of the combustor 3 has such a shape that a circumferential dimension W thereof gradually decreases from the rear side (the side on which the turbine 5 is located) toward the front side (the side on which the compressor 1 is located). More specifically, a plurality of transition duct portions 45 are arranged in the circumferential direction with substantially no gaps being formed therebetween at rear end portions 45a thereof which correspond to outlets of the transition duct portions 45 to the turbine. Each transition duct portion 45 has such a shape that the circumferential dimension W smoothly decreases from the rear end portion toward the front side. The above wording "a plurality of transition duct portions 45 are arranged . . . with substantially no gaps being formed therebetween" includes a configuration in which the plurality of transition duct portions 45 are arranged via gaps for thermal expansion.

The transition duct portion 45, which is a portion of the combustor 3 disposed inside the chamber 21 and also serving as the compressed air introduction portion in the illustrated example, is formed in such a shape that the circumferential dimension W gradually decreases from the turbine 5 side toward the compressor 1 side (FIG. 1), so that a circumferential gap 49 is formed between the transition duct portions 45, 45 of the adjacent combustors 3, 3 in the chamber 21. The outlet 19b of the diffuser 19 inclines radially outward so as to discharge the compressed air CA toward the circumferential gap 49. Specifically, as shown in FIG. 3, a turbine-side end P of the circumferential gap 49 on the inner diameter side of the transition duct portion 45 is located radially inward of an imaginary extension conical surface CO extending continuously from the outer peripheral surface of the diffuser inner tube 25. The "imaginary extension conical surface CO" is an imaginary conical surface extended along the inclination angle at the downstream-side end of the outer peripheral surface of the diffuser inner tube 25. In the illustrated example, the position of the turbine-side end P of the circumferential gap 49 coincides with the position of the rear end portion 45a of the transition duct portion 45. However, the position of the turbine-side end P of the circumferential gap 49 may be frontward of the rear end portion 45a.

As shown in FIG. 3, auxiliary elements EL of the gas turbine GT are disposed in a flow-area outside space 51, which is defined as a space outside an air flow area, and is formed, in the chamber 21, between the rotary shaft 7 and the imaginary extension conical surface CO extending continuously from the outer peripheral surface of the diffuser inner tube 25. The axial range of "the flow-area outside space 51" as defined in this specification is from the compressor outlet 1a to the turbine inlet 5a. Further, in this specification, "the auxiliary elements EL of the gas turbine GT" are the components provided for ensuring the mechanical structure and/or the engine performance of the gas turbine GT, other than the combustor 3, the rotary shaft 7, the compressor 1 and the turbine 5 which delimit the flow-area outside space 51. Examples of the auxiliary elements EL include: structural members and mechanisms for ensuring the mechanical strength of the gas turbine GT or for connecting the components of the gas turbine GT; and functional members and mechanisms for improving the engine performance of the gas turbine GT.

In the illustrated example, as the auxiliary elements EL, a connection member which is a structural member, a seal mechanism which is a functional member, and the like are disposed in the flow-area outside space 51. For example, as shown in FIG. 2, an inner tube connecting member 53 for connecting the diffuser inner tube 25 and the chamber inner tube 33 is disposed in the flow-area outside space 51. More specifically, a connection flange surface 25a extending radially inward is formed at a downstream-side end portion of the diffuser inner tube 25, and the chamber inner tube 33 is connected to the connection flange surface 25a via the inner tube connecting member 53. Further, as shown in FIG. 3, a seal member 57 (e.g., a member forming a labyrinth seal) is provided in the middle of an air extraction path to adjust a pressure of a gas extracted from an air extraction portion 59 of the compressor 1. The seal member 57 is connected to the connection flange surface 25a of the diffuser inner tube 25 via a seal connection member 60. The connection members 53 and 60 and the seal member 57 are merely examples of the auxiliary elements EL which can be disposed in the flow-area outside space 51. Instead of or in addition to these auxiliary elements EL, any other auxiliary elements may be disposed in the flow-area outside space 51.

As described above, since the outlet 19*b* of the diffuser 19 is oriented outward, the flow-area outside space 51 is formed in an area where the compressed air CA discharged from the diffuser outlet 19*b* does not directly collide against the flow-area outside space 51. Since the auxiliary elements EL are disposed in the flow-area outside space 51, the pressure loss due to collision of the compressed air CA against the auxiliary elements EL is reduced. Moreover, since the rotary shaft 7 need not be made thinner to form such a space, the rotational vibration of the rotary shaft 7 is effectively suppressed.

In the illustrated example, more specifically, the aforementioned auxiliary elements EL are disposed in the flow-area outside space 51, in particular, in the space formed between the rotary shaft 7, and the outer peripheral surface of the diffuser inner tube 25 and an imaginary cylindrical surface CY extending axially in parallel with the outer peripheral surface from the rear end of the outer peripheral surface. This configuration allows the auxiliary elements EL to be disposed at a position more distant inward from the flow of the compressed air CA discharged from the diffuser outlet 19*b* (i.e., on the side opposite to the combustor 3), whereby the pressure loss can be reduced more reliably. In order to achieve the effect of reducing the pressure loss, as shown in the figure, it is particularly preferable that the auxiliary elements EL are disposed at the connection flange surface 25*a* extending radially inward from the downstream-side end portion of the diffuser inner tube 25.

Figure 5:
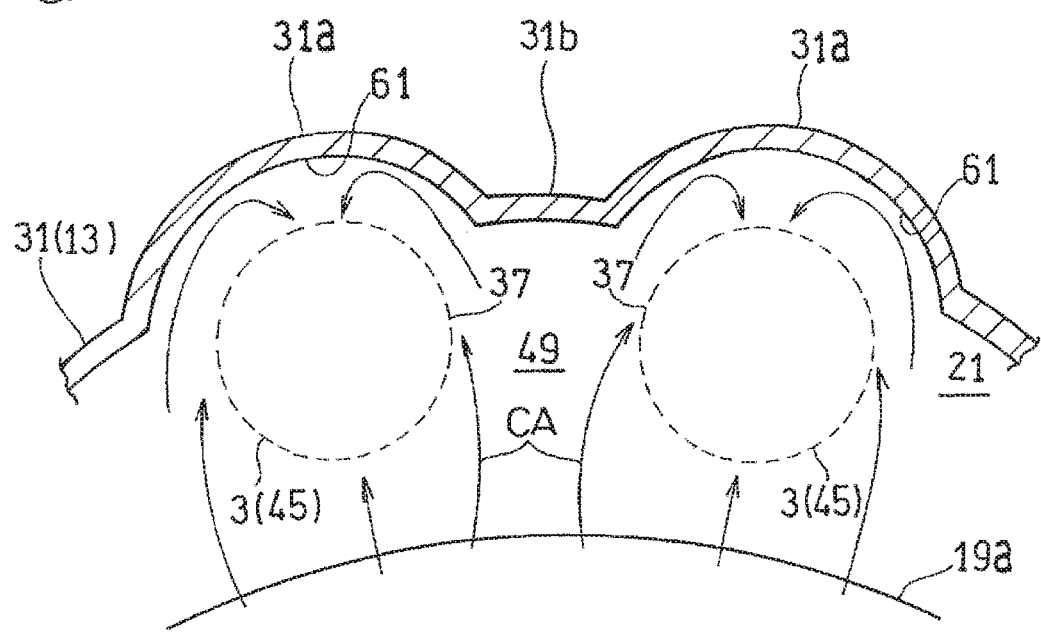
FIG. 5 is a cross-sectional view schematically showing the shape of a housing used in the gas turbine engine shown in FIG. 1.

In the present embodiment, as shown in FIG. 5, the inner wall surface of the chamber casing 31, which is a portion of the housing 13 of the gas turbine GT, has a concave surface 61 along the outer peripheral shape of each combustor 3 (in this example, the duct cover 47 of the transition duct portion 45). More specifically, in the illustrated example, a circumferential portion, of the chamber casing 31, covering each combustor 3 is formed as a curved portion 31*a* that curves so as to swell radially outward with respect to other circumferential portions of the chamber casing 31, and the inner wall surface of the curved portion 31*a* is formed as the concave surface 61. A connection portion 31*b* connecting the adjacent curved portions 31*a*, 31*a* (concave surfaces 61, 61) of the chamber casing 31 projects into a space between the adjacent combustors 3, 3 (transition duct portions 45, 45). The inner wall surface of each connection portion 31*b* is formed as a smooth annular peripheral wall surface along the circumferential direction of the gas turbine GT.

Next, the function of the gas turbine GT configured as described above will be described.

As shown in FIG. 2, the compressed air CA discharged from the compressor outlet 1*a* flows into the diffuser 19 of the compressed air supply path 17, passes through the diffuser 19 and the chamber 21, and is guided to the plurality of compressed air introduction holes 37 formed through the duct cover 47 of the combustor 3. Since the diffuser flow path 23 of the diffuser 19 is formed such that the flow-path area thereof gradually increases toward the rear side in the axial direction which is the compressed air advancing direction, the static pressure of the compressed air CA is recovered. Moreover, the sufficient circumferential gap 49 (FIG. 4) is formed between the transition duct portions 45, 45 in the chamber 21. The compressed air CA is discharged from the outlet 19*b* of the diffuser 19 directed radially outward, toward this circumferential gap 49.

The compressed air CA from the diffuser 19 passes through the wide circumferential gap 49 between the transition duct portions 45, 45, and uniformly reaches the respective combustors 3. Thus, even in the narrow space inside the chamber 21 where the plurality of transition duct portions 45 are densely disposed, a sufficient flow path for the compressed air CA discharged from the diffuser 19 is ensured. Moreover, in the present embodiment, the compressed air CA flows into each combustor 3 through the multiple compressed air introduction holes 37 provided at the surface of the duct cover 47. Therefore, the compressed air CA is smoothly introduced into the combustor 3 without dissipation of the dynamic pressure of the compressed air CA discharged from the diffuser 19, whereby the pressure loss is significantly reduced.

Furthermore, as shown in FIG. 5, the compressed air CA flowing into the circumferential gap 49 between the transition duct portions 45, 45 is guided to the surface of each combustor 3 (in particular, the surface facing radially outward) by the concave surface 61 formed at the inner wall surface of the chamber casing 31 covering the combustor 3, and is smoothly introduced into the combustor 3. Moreover, in the present embodiment, since the connection portion 31*b* connecting the adjacent curved portions 31*a*, 31*a* (concave surfaces 61, 61) projects into a space between the adjacent combustors 3, 3 (transition duct portions 45, 45) as described above, the compressed air CA is uniformly supplied to the plurality of combustors 3 arranged in the circumferential direction. Thus, the flow of the compressed air CA is uniformly supplied in the circumferential direction, over the entire surface of the duct cover 47 that is a compressed air introduction portion of the combustor 3, whereby the pressure loss can be reduced extremely effectively.

An inclination angle α of the diffuser 19 at the diffuser outlet 19*b* with respect to the rotation axis C1 is preferably equal to or smaller than 90°, and more preferably equal to or smaller than 60°. In the illustrated example, α=45°. The inclination angle α of the diffuser 19 in the present specification is defined as an angle formed between a path center line C3 along the diffuser flow path 23 in the longitudinal cross section of the diffuser flow path 23, and the rotation axis C1 of the gas turbine GT. If the inclination angle α exceeds 90°, the curve of the diffuser flow path 23 becomes excessive, and the pressure loss in the diffuser flow path 23 increases.

As described above, in the gas turbine GT according to the present embodiment, the pressure loss of the compressed air CA supplied from the compressor 1 to the combustor 3 can be sufficiently reduced while suppressing an increase in the axial dimension of the entire gas turbine GT by disposing the diffuser 19 and the combustor 3 such that the axial positions thereof overlap each other.

In the present embodiment, a gas turbine engine using air as a working gas is described as an example of the gas turbine GT. However, a gas turbine engine using a working gas other than air, such as carbon dioxide, is also within the scope of the present invention.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

Although not included in the scope of the present invention, a gas turbine engine may be provided in which a circumferential gap is not formed between adjacent transition duct portions 45, 45 by the transition duct portion 45 of each combustor 3 having such a shape that the circumferential dimension thereof gradually decreases from the turbine side toward the compressor side. Also in this gas turbine engine, the effect of reducing the pressure loss can be achieved by disposing the auxiliary elements EL radially inward of the imaginary extension conical surface CO extending continuously from the outer peripheral surface of the diffuser inner tube 25 and/or by forming the concave surface 61 at the inner wall surface of the chamber casing 31 that covers each combustor 3 and causing the connection portion 31b connecting the concave surfaces 61, 61 to project between adjacent combustors 3, 3.

REFERENCE NUMERALS

1 ... Compressor
3 ... Combustor
5 ... Turbine
17 ... Compressed air supply path
19 ... Diffuser
21 ... Chamber
23 ... Diffuser flow path
25 ... Diffuser inner tube
27 ... Diffuser outer tube
37 ... Compressed air introduction hole
45 ... Transition duct
47 ... Duct cover
α ... Inclination angle of diffuser
C1 ... Rotation axis of gas turbine engine
C2 ... Axis of combustor
CA ... Compressed air (compressed gas)
GT ... Gas turbine engine

What is claimed is:

1. A gas turbine engine in which a compressed gas from a compressor is burned and an obtained combustion gas drives a turbine, the gas turbine engine comprising:
   a plurality of combustors, each combustor having a tubular shape, being configured to burn the compressed gas from the compressor, and being positioned such that an axis thereof inclines, with respect to a rotation axis of the gas turbine engine, radially outward from a side on which the turbine is located toward a side on which the compressor is located;
   a diffuser outer tube forming an outer diameter side wall of a diffuser of an annular shape that forms an upstream portion of a compressed gas supply path configured to guide the compressed gas discharged from the compressor to the plurality of combustors;
   a diffuser inner tube disposed concentrically with the diffuser outer tube, and forming an inner diameter side wall of the diffuser; and
   a plurality of transition duct portions including a transition duct portion for said each combustor, each transition duct portion of the plurality of transition duct portions being a portion of a respective combustor of the plurality of combustors disposed inside a chamber forming a downstream portion of the compressed gas supply path, said each transition duct portion of said each combustor being configured to supply the obtained combustion gas from the respective combustor of the plurality of combustors to the turbine,
   wherein said each transition duct portion of said each combustor has such a shape that a circumferential dimension thereof gradually decreases from the side on which the turbine is located toward the side on which the compressor is located, so that a circumferential gap is formed between adjacent transition duct portions of adjacent combustors of the plurality of combustors,
   at least a portion on a downstream side of the diffuser inner tube and at least a portion on a downstream side of the diffuser outer tube have respective shapes gradually increasing in diameter toward the downstream side,
   a turbine-side end of the circumferential gap at an inner diameter side of the transition duct portion is positioned radially inward of an imaginary extension conical surface extending continuously from an outer peripheral surface of the diffuser inner tube,
   an inner wall surface of a portion, forming the chamber, of a housing of the gas turbine engine, has a concave surface along an outer peripheral shape of said each transition duct portion of said each combustor of the plurality of combustors, and
   a connection portion positioned between adjacent concave surfaces projects into a space between the adjacent transition duct portions of the adjacent combustors of the plurality of combustors.

2. The gas turbine engine as claimed in claim 1, wherein said each transition duct portion of said each combustor includes a duct body that forms a supply path for the obtained combustion gas, and a duct cover that covers an outer periphery of the duct body, and
   the duct cover is formed with a plurality of introduction holes configured to introduce the compressed gas into said each combustor of the plurality of the combustors.

3. The gas turbine engine as claimed in claim 1, wherein the diffuser includes an outlet having an inclination angle equal to or smaller than 90° with respect to the rotation axis.

4. The gas turbine engine as claimed in claim 1, wherein an auxiliary element of the gas turbine engine is disposed in a space in the chamber formed between the imaginary extension conical surface and a rotary shaft of the gas turbine engine.

5. The gas turbine engine as claimed in claim 4, wherein the diffuser inner tube has a downstream-side end portion formed with a connection flange surface extending radially inward, and
   a chamber inner tube forming an inner diameter side wall of the chamber is connected to the connection flange surface via an inner tube connecting member which is the auxiliary element.

6. The gas turbine engine as claimed in claim 4, wherein the diffuser inner tube has a downstream-side end portion formed with a connection flange surface extending radially inward, and
   a seal member, which is the auxiliary element, configured to adjust a pressure extracted from the compressor is connected to the connection flange surface via a seal connection member which is another auxiliary element.

7. The gas turbine engine as claimed in claim 1, wherein the connection portion covers the circumferential gap formed between the adjacent transition duct portions of the adjacent combustors in a radially outward direction of the gas turbine engine.

8. The gas turbine engine as claimed in claim 7, wherein the diffuser is configured to guide the compressed gas discharged from the compressor directly to the circumferential gap that is covered by the connection portion.

9. The gas turbine engine as claimed in claim 1, wherein the connection portion has a curvature in a circumferential direction of the gas turbine engine that is less than a curvature of the adjacent transition duct portions in the circumferential direction.

10. The gas turbine engine as claimed in claim 1, wherein the connection portion positioned between the adjacent concave surfaces projects into the space between the adjacent combustors of the plurality of combustors, such that the connection portion is located closer to the diffuser than an entirety of the adjacent concave surfaces in a radial direction of the gas turbine engine.

* * * * *